(12) United States Patent
Aratsu et al.

(10) Patent No.: US 8,661,502 B2
(45) Date of Patent: Feb. 25, 2014

(54) DETERMINING A SENSITIVITY LABEL OF DOCUMENT INFORMATION IN REAL TIME

(75) Inventors: Taku Aratsu, Kanagawa (JP); Sanehiro Furuichi, Kanagawa (JP); Hideo Ichinomiya, Kanagawa (JP); Hayato Kiriyama, Kanagawa (JP); Masami Tada, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 13/226,457

(22) Filed: Sep. 6, 2011

(65) Prior Publication Data

US 2012/0072969 A1 Mar. 22, 2012

(30) Foreign Application Priority Data

Sep. 22, 2010 (JP) ................................. 2010-212392

(51) Int. Cl.
*G06F 17/00* (2006.01)

(52) U.S. Cl.
USPC .............................................................. 726/1

(58) Field of Classification Search
USPC .............................................................. 726/1
See application file for complete search history.

(56) References Cited

U.S. PATENT DOCUMENTS

| | | | |
|---|---|---|---|
| 5,010,429 A | 4/1991 | Taguchi et al. | |
| 5,376,446 A | 12/1994 | Huang | |
| 5,413,850 A | 5/1995 | Nehring | |
| 5,903,732 A * | 5/1999 | Reed et al. | 709/229 |
| 5,967,880 A | 10/1999 | Major | |
| 6,101,066 A | 8/2000 | Ishihara et al. | |
| 6,150,017 A | 11/2000 | Burmeister et al. | |
| 6,650,511 B2 | 11/2003 | Hsiao et al. | |
| 6,927,951 B2 | 8/2005 | Huha et al. | |
| 6,998,175 B2 | 2/2006 | Murata et al. | |
| 7,059,760 B2 | 6/2006 | Mehta et al. | |
| 7,223,922 B2 | 5/2007 | Bandy, IV et al. | |
| 7,285,846 B1 | 10/2007 | Tran | |
| 7,525,047 B2 | 4/2009 | Iben et al. | |

(Continued)

FOREIGN PATENT DOCUMENTS

| | | |
|---|---|---|
| JP | 2003-099400 | 4/2003 |
| JP | 2003-150482 | 5/2003 |

(Continued)

OTHER PUBLICATIONS

"LiveCycle Rights Management", [online], Adobe Systems Incorporated, [search on Sep. 15, 2010], Internet, <URL: http://www.adobe.com/jp/products/livecycle/rightsmanagement/> (no translation).

(Continued)

*Primary Examiner* — Kambiz Zand
*Assistant Examiner* — Abiy Getachew
(74) *Attorney, Agent, or Firm* — Zilka-Kotab, PC (57) ABSTRACT

A sensitivity label for document information in a document may be determined in real time, according to one embodiment, by flexibly and dynamically determining a sensitivity label for the document based on content included in information within the document. Information within a document varies from day to day, for example, document information may decrease in importance with time, increase in importance due to an event, etc. Therefore, the sensitivity label of the document, according to embodiments described herein, may also change dynamically in accordance with document content, information, etc.

20 Claims, 6 Drawing Sheets

(56) References Cited

U.S. PATENT DOCUMENTS

| | | |
|---|---|---|
| 7,934,249 B2 * | 4/2011 | Chan et al. .................... 726/1 |
| 2002/0190426 A1 | 12/2002 | Seidner et al. |
| 2003/0218851 A1 | 11/2003 | Harris et al. |
| 2004/0187020 A1 * | 9/2004 | Leerssen et al. ............. 713/200 |
| 2006/0098351 A1 | 5/2006 | Iben |
| 2007/0036970 A1 | 2/2007 | Stumphauzer et al. |
| 2007/0146941 A1 | 6/2007 | Harris et al. |
| 2007/0300298 A1 * | 12/2007 | Goranson et al. ............... 726/22 |
| 2008/0151288 A1 * | 6/2008 | Matsunoshita ............. 358/1.15 |
| 2008/0268206 A1 | 10/2008 | Maldonado Arellano |
| 2009/0104438 A1 | 4/2009 | Lalli et al. |
| 2009/0242823 A1 | 10/2009 | Kanakarajan et al. |
| 2009/0271840 A1 * | 10/2009 | Gillet et al. ........................ 726/1 |
| 2009/0288864 A1 | 11/2009 | Iben et al. |
| 2009/0289231 A1 | 11/2009 | Bandy, IV et al. |
| 2009/0290260 A1 | 11/2009 | Bandy, IV et al. |
| 2009/0290278 A1 | 11/2009 | Iben et al. |
| 2010/0010968 A1 * | 1/2010 | Redlich et al. .................... 707/3 |
| 2010/0250497 A1 * | 9/2010 | Redlich et al. ................ 707/661 |
| 2011/0020642 A1 | 1/2011 | Yaguchi et al. |
| 2011/0047590 A1 * | 2/2011 | Carr et al. ........................ 726/1 |

FOREIGN PATENT DOCUMENTS

| | | |
|---|---|---|
| JP | 2004-272423 | 9/2004 |
| JP | 2006-012117 | 1/2006 |
| JP | 2007-004616 | 1/2007 |
| JP | 2007-199910 | 8/2007 |
| JP | 2007-207171 | 8/2007 |
| JP | 2008-033936 | 2/2008 |
| JP | 2009-033228 | 2/2009 |
| JP | 2009-157453 | 7/2009 |
| JP | 2009-163464 | 7/2009 |
| JP | 2009-163570 | 7/2009 |
| JP | 2009-265854 | 11/2009 |
| JP | 2009-271609 | 11/2009 |

OTHER PUBLICATIONS

Non-Final Office Action Summary from U.S. Appl. No. 12/125,004 dated May 25, 2011.

* cited by examiner

```
If (doc_type="document")
    then refer_to(policy_doc);
else if (doc_type="spread sheet")
    then refer_to(policy_spread);
else if ...
...
```

```
            policy_doc

If (subject="Product A")
    then refer_to(product_policy1);
else if (subject="Product B")
    then refer_to(product_policy2);
else if (subject="HR")
    if (theme="Payroll")
        then refer_to(ext_db1);
    else if (theme="Layoff")
        then refer_to(ext_db2);
...
```

FIG. 4A

| CONTENT TYPE | SENSITIVITY LABEL |
|---|---|
| INFORMATIVE MATTER | WHEN POLICY INFORMATION GENERATION DATE IS EARLIER THAN %DB.Date1%: Confidential<br>OTHERWISE: Nonconfidential |
| DESIGN INFORMATION | BEFORE COMPLETION OF PRODUCT: Confidential<br>AFTER COMPLETION OF PRODUCT: Nonconfidential |
| SOURCE CODE | Top secret |
| USER'S GUIDE | Nonconfidential |
| ... | ... |

FIG. 4B

| SENSITIVITY LABEL | IMPLEMENTATION POLICY |
|---|---|
| Top secret | • DENY PROCESSING RELATED TO COPY AND PASTE OPERATION, PRINT OPERATION, AND SAVE OPERATION<br>• EMBED LABEL IN HEADER PART OF CONTENT<br>• RECORD ALL OPERATION LOGS |
| Confidential | • DENY PROCESSING RELATED TO PRINT OPERATION FROM OTHER THAN SPECIFIC POSITION<br>• DENY PROCESSING RELATED TO COPY AND PASTE OPERATION |
| Nonconfidential | • PERMIT PROCESSING RELATED TO ALL OPERATIONS |
| . . . | . . . |

DETERMINING A SENSITIVITY LABEL OF DOCUMENT INFORMATION IN REAL TIME

RELATED APPLICATIONS

The present application claims priority from a Japanese Patent Application, Appl. No. 2010-212392, filed Sep. 22, 2010, which is incorporated herein by reference.

BACKGROUND

The present invention relates to document storage and organization, and particularly to determining a sensitivity label of document information.

Recently, there have been more attempts to increase the security of managing resources in large or small organizations, such as a company, enterprise, government agency, etc. This increased emphasis on security has arisen based in part on security breaches of some of the more sensitive data that these companies store. For example, in one attempt to increase security, a method controls access to a shared resource by a user who belongs to a plurality of groups. Another method for increased security controls access to a file, a folder, and the like based on positional information of a device that uses the file, folder, or the like. Yet another method for increasing security, in response to a request to access content on a network, controls the access to the content based on policy information defining access control.

For document information access control, a policy management server may be used to issue policy information that is applied to document information, such as file format, to assign a sensitivity label, thereby enabling an access right and an expiration date to be set on a per-document-information basis.

BRIEF SUMMARY OF INVENTION

In one embodiment, a system includes logic adapted for detecting a predetermined operation for document information, logic adapted for extracting a content of the document information in response to detection of the predetermined operation, logic adapted for acquiring policy information representing a relationship between the content and a sensitivity label, and logic adapted for determining the sensitivity label of the document information by determining the sensitivity label corresponding to the content based on the policy information in response to extraction of the content.

In another embodiment, a device for determining a sensitivity label of document information includes an operation detection module configured for detecting a predetermined operation for document information, a content extraction module configured for extracting a content included in the document information in response to the detection of the predetermined operation, a policy information acquisition module configured for acquiring policy information representing a relationship between the content and the sensitivity label, a determination module configured for determining the sensitivity label of the document information by determining the sensitivity label corresponding to the content based on the policy information in response to the extraction of the content, a position module configured for acquiring positional information, and a communication module configured for communicating with a policy server, wherein the sensitivity label of the content is determined based on the positional information and the policy information.

According to another embodiment, a system includes a policy server having a policy information management module configured for generating policy information for transmission to a device in response to reception of a request to acquire policy information from the device, and transmitting the policy information to the device, the policy information representing a relationship between a content of the document information and a sensitivity label, and a device for determining a sensitivity label of document information, the device including an operation detection module configured for detecting a predetermined operation for the document information, a content extraction module configured for extracting the content of the document information in response to the detection of the predetermined operation, a policy information acquisition module configured for requesting the policy server to acquire the policy information and acquiring the policy information from the policy server, and a determination module configured for determining the sensitivity label of the document information by determining the sensitivity label corresponding to the content based on the policy information in response to extraction of the content.

In another embodiment, a computer program product includes a computer readable storage medium having computer readable program code embodied therewith, the computer readable program code being configured to detect a predetermined operation for document information, extract a content of the document information in response to detection of the predetermined operation, acquire policy information representing a relationship between the content and a sensitivity label, and determine the sensitivity label of the document information by determining the sensitivity label corresponding to the content based on the policy information in response to extraction of the content.

According to another embodiment, a method includes detecting a predetermined operation for document information, extracting a content of the document information in response to detection of the predetermined operation, acquiring policy information representing a relationship between the content and a sensitivity label, and determining the sensitivity label of the document information by determining the sensitivity label corresponding to the content based on the policy information in response to extraction of the content, wherein the policy information is acquired from a policy server.

Other aspects and embodiments as described in the present specification will become apparent from the following detailed description, which, when taken in conjunction with the drawings, illustrate by way of example the principles of the invention.

DETAILED DESCRIPTION

The following description is made for the purpose of illustrating the general principles as described in the present specification and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for determining a sensitivity label of document information in real time along with flexibly determining a sensitivity label based on content included in the document information. Utilization of document information varies from day to day. For instance, in one case, document information may decrease in importance with time. In another example, on the other hand, a sensitivity label of the document information, once assigned, may rarely be changed. However, conventional methods do not support changing the sensitivity label of the document information once it is assigned. This may cause a situation where the sensitivity label assigned to the document information using any of the prior art methods becomes inappropriate over time, though it was initially appropriate at the time of generation of the document information.

In view of this, there is a demand for a way to determine a sensitivity label of document information in real time. Moreover, though document information may partially include sensitive information, the prior art methods cannot assign a sensitivity label based on content included in the document information. Therefore, there is also a demand for a way to flexibly determine a sensitivity label based on content included in the document information.

According to one general embodiment, a method, a computer program product, and a system for determining a sensitivity label of document information includes acquiring policy information from a policy server representing a relationship between content and a sensitivity label. The content of the document information is extracted in response to detection of a predetermined operation for the document information, and the sensitivity label of the document information is determined based on the sensitivity label corresponding to the content and the policy information acquired from the policy server.

According to another embodiment, execution control for the document information is performed based on the determined sensitivity label and the acquired policy information, in response to the determination of the sensitivity label.

Furthermore, in another embodiment, the execution control for the document information is performed based on a type of the predetermined operation, the determined sensitivity label, and/or the acquired policy information. In addition, in some embodiments, the sensitivity label is determined for each content of the document information based on the policy information acquired from the policy server, and the execution control for the content of the document information is performed based on the determined sensitivity label and the acquired policy information.

In another embodiment, positional information of a location of the requested information is determined, and the sensitivity label of the content is determined based on the positional information and the policy information acquired from the policy server.

According to one embodiment, in response to the predetermined operation being performed on the document information, the sensitivity label of the document information is determined by determining the sensitivity label corresponding to content included in the document information based on the policy information. Hence, the sensitivity label of the document information may be determined in real time. Moreover, according to one approach, the sensitivity, label may be flexibly determined based on the content included in the document information.

As will be appreciated by one skilled in the art, aspects as described in the present specification may be embodied as a system, method or computer program product. Accordingly, aspects as described in the present specification may take the form of an entirely hardware embodiment, an entirely software embodiment (including firmware, resident software, micro-code, etc.) or an embodiment combining software and hardware aspects that may all generally be referred to herein as "logic", a "circuit," "module" or "system." Furthermore, aspects as described in the present specification may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. More specific examples (a non-exhaustive list) of the computer readable signal medium would include the following: an electrical connection having one or more wires, an optical fiber, any suitable combination of the foregoing, etc. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects as described in the present specification may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects as described in the present specification are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanism for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Generally speaking, embodiments of systems, methods, and computer program products as described herein may include and/or utilize components such as a recording module adapted for recording event history information for one or more events associated with an entity, an evaluating module adapted for evaluating the event history information for each of the one or more events associated with the entity against a symptom rule, the symptom rule defining a validity state of a diagnosis, an issuing module adapted for issuing a subscription to one or more subscribers, the subscription enabling the one or more subscribers to receive diagnosis information, and an indicating module adapted for indicating the validity state of the diagnosis to the subscriber. Furthermore, the recording module and the evaluating module may operate independently such that the issuing module and the event history information and are substantially decoupled.

Figure 1:
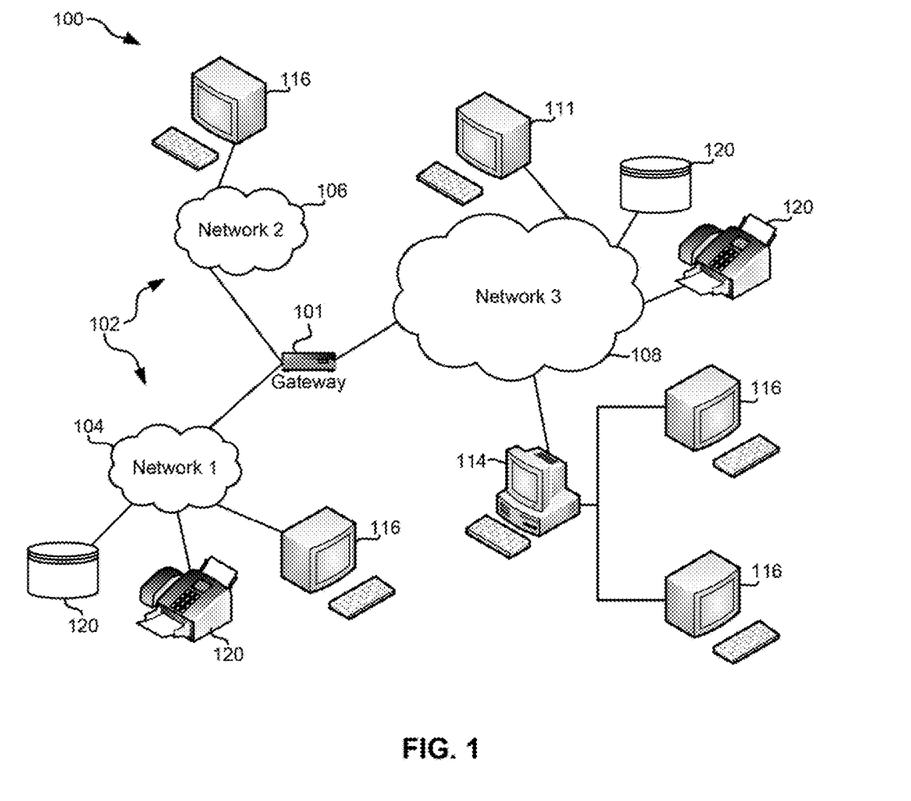
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
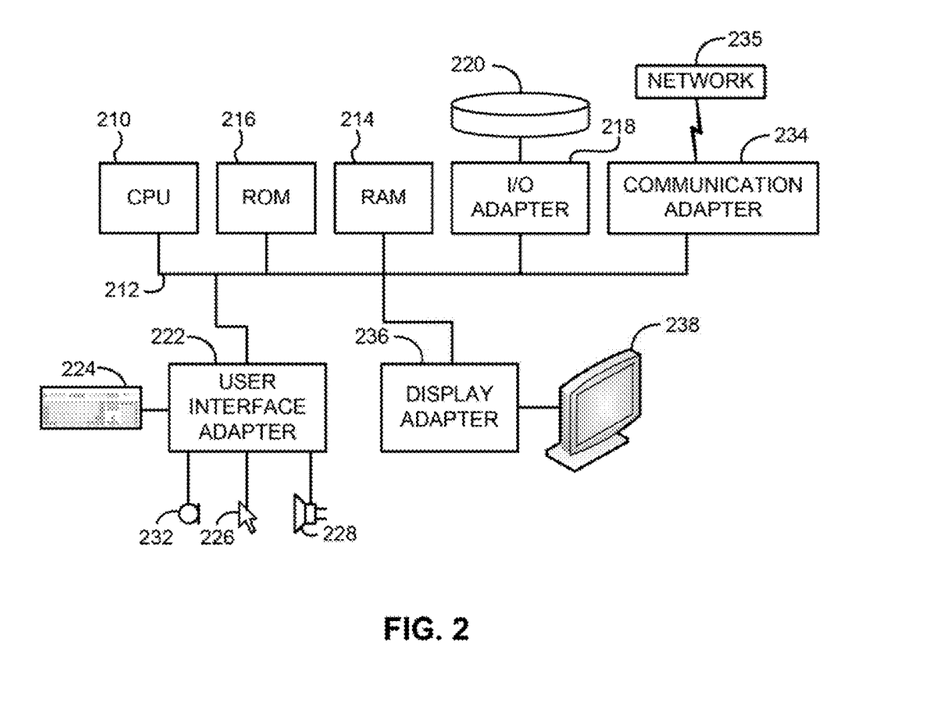
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Of course, this logic may be implemented as a method on any device and/or system or as a computer program product, according to various embodiments.

Figure 3:
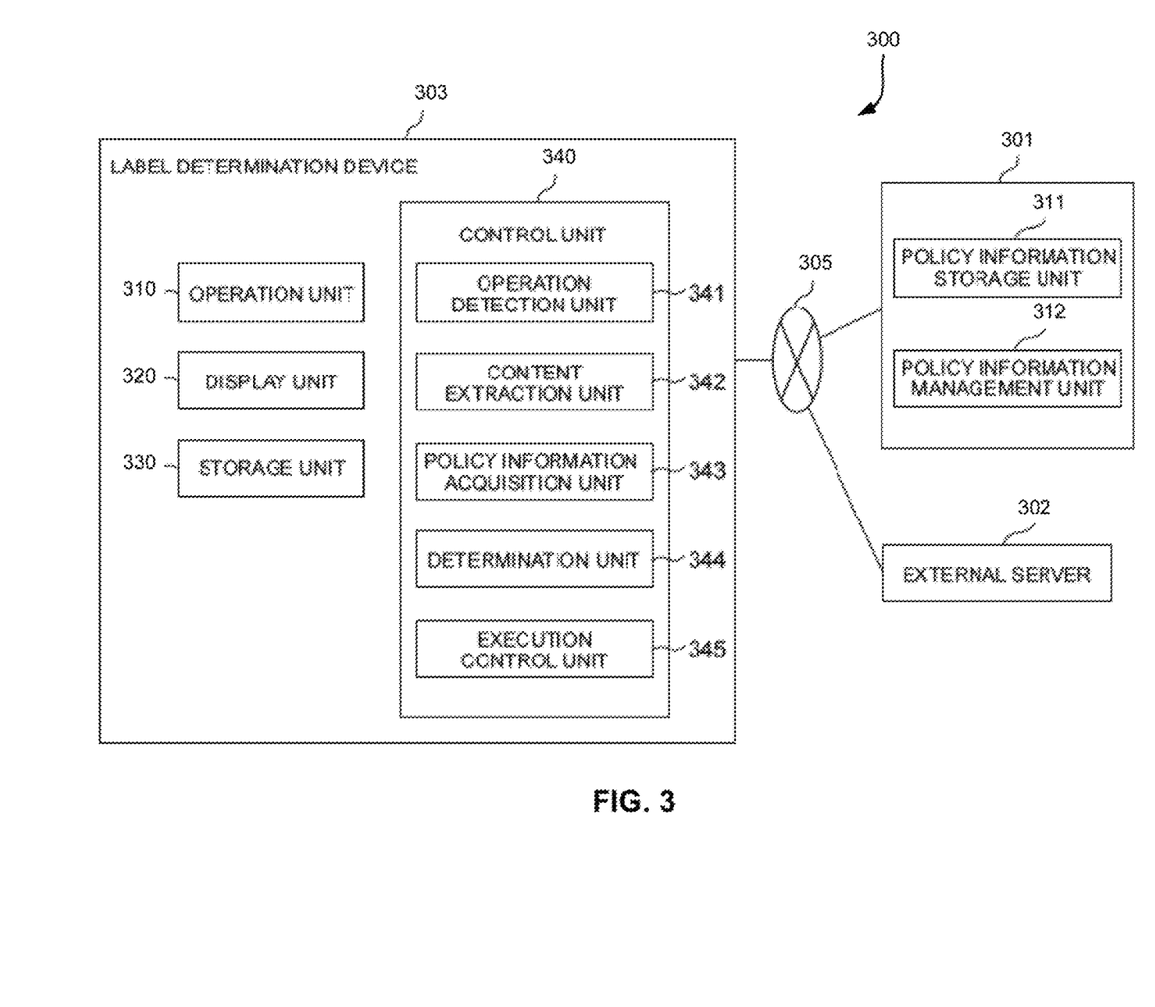
FIG. 3 is a diagram schematically showing a label determination device, according to one embodiment.

FIG. 3 is a diagram schematically showing a system 300 according to one embodiment. The system 300 may include a label determination device 303 for determining a sensitivity label of document information. The label determination device 303 is connectable to a policy server 301 for storing policy information and an external server 302 for storing parameter information related to the policy information, via a communication network 305 such as a LAN, a WAN, the Internet, etc.

According to one embodiment, the label determination device 303 may include an operation unit 310 (such as for controlling operation and/or functionality of the label determination device 303), a display unit 320 (such as for outputting graphical representations on a display, monitor, etc.), and/or a storage unit 330 (such as for storing information, data, files, etc.), as would be understood by one of skill in the art upon reading the present descriptions.

In one embodiment, the document information may be electronic data, such as a document file that includes a character string which may be operated by a computer. The sensitivity label may be information representing sensitivity of the document information. The sensitivity label may have a plurality of levels including, for example, "Top Secret," "Confidential," "Proprietary," etc. Of course, any document information and sensitivity labels may be used, as would be understood by one of skill in the art upon reading the present descriptions.

The policy server 301 includes a policy information storage unit 311 and a policy information management unit 312. The policy information storage unit 311 stores labeling policy information representing a relationship between content that may be included in the document information and a sensitivity label, and enforcement policy information defining details of control for the document information based on the sensitivity label.

Figure 4A:
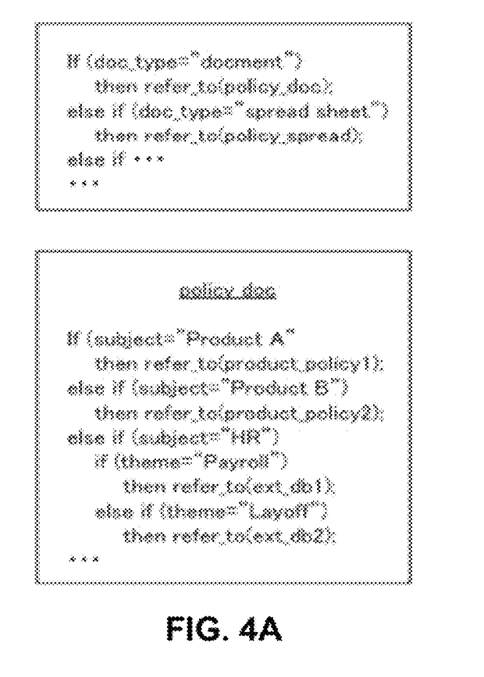
FIGS. 4A-4B are exemplary diagrams showing examples of labeling policy information, according to one embodiment.
Figure 4B:
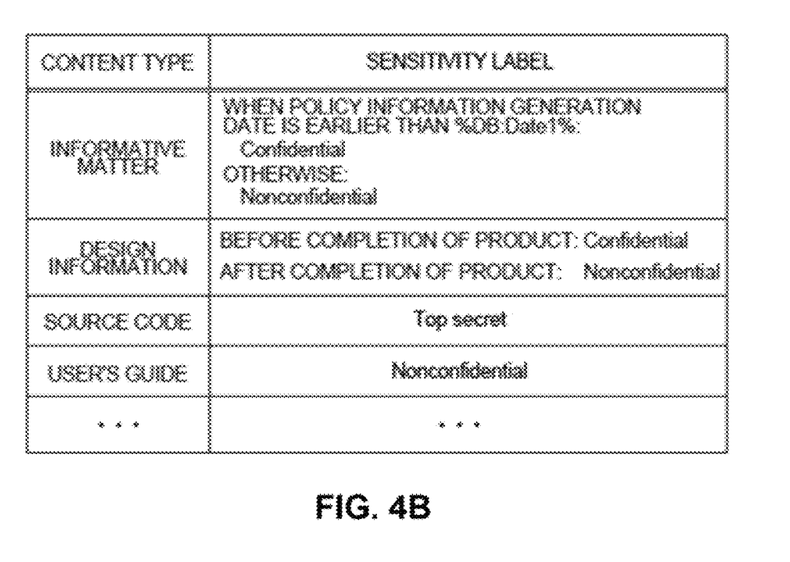

FIGS. 4A-4B are exemplary diagrams showing examples of the labeling policy information, according to one embodiment. The labeling policy information comprises first labeling policy information shown in FIG. 4A for classifying a content into a predetermined type, and second labeling policy information shown in FIG. 4B for defining a sensitivity label corresponding to the content of the predetermined type.

Figure 5:
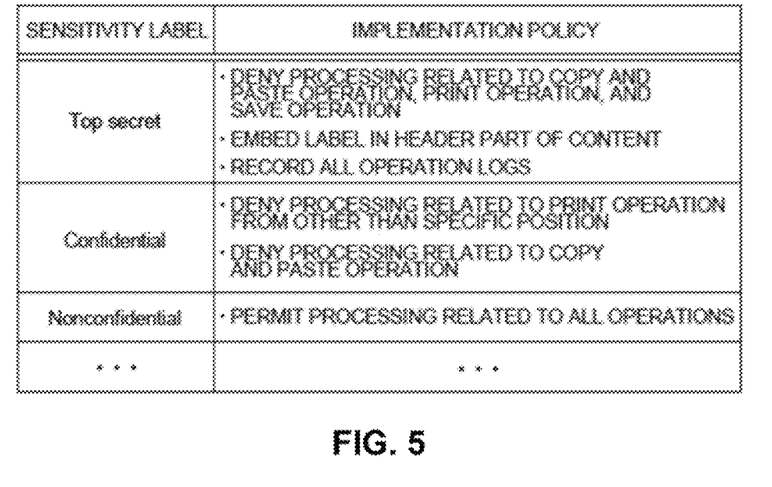
FIG. 5 is a diagram showing an example of enforcement policy information, according to one embodiment.

In one embodiment, the first labeling policy information comprises policy information for classifying a type of document information and policy information for classifying a content in each document type into a predetermined type, as shown in FIG. 4A. In FIG. 4A, "policy_doc" is shown as an example of policy information for classifying content in a document type into a predetermined type. Also, "product_policy1" is shown as an example of second labeling policy information referenced from "policy_doc," according to one embodiment. Though one set of second labeling policy information is shown in FIG. 4A, a plurality of sets of second labeling policy information may be stored in the policy information storage unit (311, FIG. 3), according to various embodiments FIG. 5 is a diagram showing an example of enforcement policy information according to one embodiment. The enforcement policy information represents, for each of a plurality of sensitivity labels, details of control corresponding to an operation performed on document information, in one approach. The enforcement policy information may also include enforcement policy information applicable to document information, and enforcement policy information applicable to each content of document information.

For example, enforcement policy information related to a copy and paste operation or a save operation is enforcement policy information applicable to document information itself, whereas enforcement policy information related to a print operation is enforcement policy information applicable to each content of document information.

Referring again to FIG. 3, the labeling policy information and the enforcement policy information stored in the policy information storage unit 311 includes parameters. These parameters may be changed by the policy information management unit 312. For instance, the second labeling policy information includes a parameter indicating a date as a sensitivity label decision condition, and this date may be changed by the policy information management unit 312.

In the embodiment shown in FIG. 4B, "%DB:Date1%" is included in the second labeling policy information as a parameter indicating a date. Referring now to FIG. 3, the policy information management unit 312 may generate policy information to be transmitted to the label determination device 303 according to one approach, and may transmit the generated policy information to the label determination device 303, in response to reception of a policy information acquisition request from the label determination device 303.

In a more detailed discussion, based on a parameter included in policy information, the policy information management unit 312 may acquire information corresponding to the parameter, from the external server 302. The policy information management unit 312 then generates the policy information, based on the information corresponding to the parameter. The policy information management unit 312 transmits the generated policy information to the label determination device 303, according to one embodiment.

For example, in response to the reception of the policy information acquisition request from the label determination device 303, the policy information management unit 312 acquires, from the external server 302, date information as information corresponding to the parameter "%DB:Date1%" included in a label of a content type "informative matter" as shown in FIG. 4B. Referring again to FIG. 3, in a case where a policy information generation date is earlier than the acquired date information, the policy information management unit 312 may set a sensitivity label of the content type "informative matter" to "Confidential." Otherwise, the policy information management unit 312 may set the sensitivity label of the content type "informative matter" to "Nonconfidential," according to another embodiment. The policy information management unit 312 transmits the policy information generated in this way, to the label determination device 303.

The label determination device 303 includes an operation unit 331 for receiving a direct operation input from a user, a display unit 332 for displaying information about functions of the label determination device 303 and displaying document information, a storage unit 333 for storing various programs (not shown) for causing operation of the label determination device 303, a program (not shown) for executing functions described herein, document information, etc., and a control unit 334 for controlling each function of the label determination device 303 in an integrated manner.

The control unit 334 includes an operation detection unit 341 as an operation detection mechanism, a content extraction unit 342 operating as a content extraction mechanism, a policy information acquisition unit 343 operating as a policy information acquisition mechanism, a determination unit 344 operating as a determination mechanism, and an execution control unit 345.

According to one embodiment, the operation detection unit 341 detects a predetermined operation for document information. More particularly, the operation detection unit 341 may detect a predetermined operation input for the document information by the operation unit 331. According to various embodiments, the predetermined operation input for the document information may be an input related to, for example, an operation such as viewing, printing, copying to an external medium, mailing transmission of the document information, etc.

The content extraction unit 342 extracts a content included in the document information for which the predetermined operation is performed, in response to the detection of the predetermined operation by the operation detection unit 341. According to various embodiments, the content may be a name (file name) of the document information, a type of the document information, a label assigned to the document information previously, a document included in the document information, a document type assigned to the document, etc.

The policy information acquisition unit 343 acquires the policy information from the policy server 301 at regular time intervals. According to various embodiments, the policy information acquisition unit 343 may receive the labeling policy information and the enforcement policy information from the policy server 301. The policy information acquisition unit 343 stores the received labeling policy information and enforcement policy information in the storage unit 333 for a fixed period, in some approaches.

Though the above describes a case where the policy information acquisition unit 343 acquires the policy information from the policy server 301 at regular time intervals and stores the acquired policy information in the storage unit 333 for a fixed period, the embodiments described herein are not so limited. The policy information acquisition unit 343 may acquire the policy information from the policy server 301, in response to the extraction of the content by the content extraction unit 342.

The determination unit 344 determines a sensitivity label of the document information by determining a sensitivity label corresponding to the content based on the policy information acquired by the policy information acquisition unit 343, in response to the extraction of the content by the content extraction unit 342, in some approaches.

More particularly, in response to the acquisition of the content by the content extraction unit 342, the determination unit 344 classifies the content into a predetermined type, based on the first labeling policy information included in the labeling policy information acquired by the policy information acquisition unit 343, in one approach. Following this, the determination unit 344 determines a sensitivity label corresponding to the content of the predetermined type based on the second labeling policy information included in the labeling policy information acquired by the policy information acquisition unit 343, thereby determining the sensitivity label of the document information, in another approach.

In a case where a plurality of contents are included in the document information, the determination unit 344 performs the sensitivity label determination for each of the plurality of contents, and sets a sensitivity label of highest sensitivity among sensitivity labels obtained by the determination, as the sensitivity label of the document information, according to one embodiment.

The sensitivity label of the document information and the sensitivity label of each of the plurality of contents determined by the determination unit 344 are passed to the execution control unit 345. Though the above description depicts the case where the determination unit 344 determines, in response to the extraction of the content by the content extraction unit 342, the sensitivity label of the document information by determining the sensitivity label corresponding to the content based on the policy information acquired by the policy information acquisition unit 343, embodiments described herein are not so limited.

For instance, the label determination device 303 may be a computing device, such as a mobile terminal, a notebook computer, a tablet computer, etc., that is capable of being transported by a user, and the determination unit 344 may determine, in response to the extraction of the content by the content extraction unit 342, the sensitivity label of the content based on position information of the label determination device 303 and the policy information acquired by the policy information acquisition unit 343. In this case, the label determination device 303 includes a position information acquisition unit for measuring a position of the label determination device 303 by, for example, GPS (Global Positioning System), cell tower triangulation, radio frequency identification device (RFID), etc.

In the arrangement where the sensitivity label of the content is determined based on the positional information of the label determination device 303 and the policy information acquired by the policy information acquisition unit 343, the label determination device 303 may have a password for the document information, set sensitive information in a body of the document information, and/or display the sensitivity label on a printing surface of the document information, according to a result of the determination, in various embodiments.

In other embodiments, the label determination device 303 may determine whether or not the document information is referenced by the user and, in the case of determining that the document information is referenced, determine the sensitivity label corresponding to the content at regular time intervals.

The execution control unit 345 performs execution control for the document information based on the type of the predetermined operation input detected by the operation detection unit 341, the sensitivity label determined by the determination unit 344, and the enforcement policy information acquired by the policy information acquisition unit 343, in response to the determination of the sensitivity label of the document information by the determination unit 344, in one approach.

Particularly, the execution control unit 345 may reference the enforcement policy information acquired by the policy information acquisition unit 343, and may acquire enforcement policy information corresponding to the sensitivity label determined by the determination unit 344. The execution control unit 345 then specifies control information corresponding to the type of the predetermined operation input detected by the operation detection unit 341, from the acquired enforcement policy information. In the case where the enforcement policy information applied to the detected predetermined operation is enforcement policy information applied to document information, the execution control unit 345 performs control for the document information. In the case where the enforcement policy information applied to the detected predetermined operation is enforcement policy information applied to each content of document information, the execution control unit 345 performs control for the content.

Referring now to FIGS. 3 and 5, as an example in a case where the sensitivity label of the document information is "Top Secret" and the predetermined operation is a save operation, the execution control unit 345 may control so as to disable processing related to the save operation, based on the enforcement policy information.

As another example, in a case where the predetermined operation is the print operation, the execution control unit 345 may control so as to enable or disable printing for each content of the document information, based on the enforcement policy information shown in FIG. 5. In this case, a printed matter may include, for example, content information printed as it is and content information masked so that the content information cannot be recognized, according to one example.

Moreover, as the execution control for the content of the document information, the execution control unit 345 may embed the sensitivity label of the document in a header part or a footer part of the document information, in a display field of a title of the document information, etc. Furthermore, the execution control unit 345 may change a color of a window frame, a shape of a mouse cursor corresponding to the document information, etc., according to the sensitivity label.

The following describes a processing flow of the label determination device 303, according to one embodiment.

Figure 6:
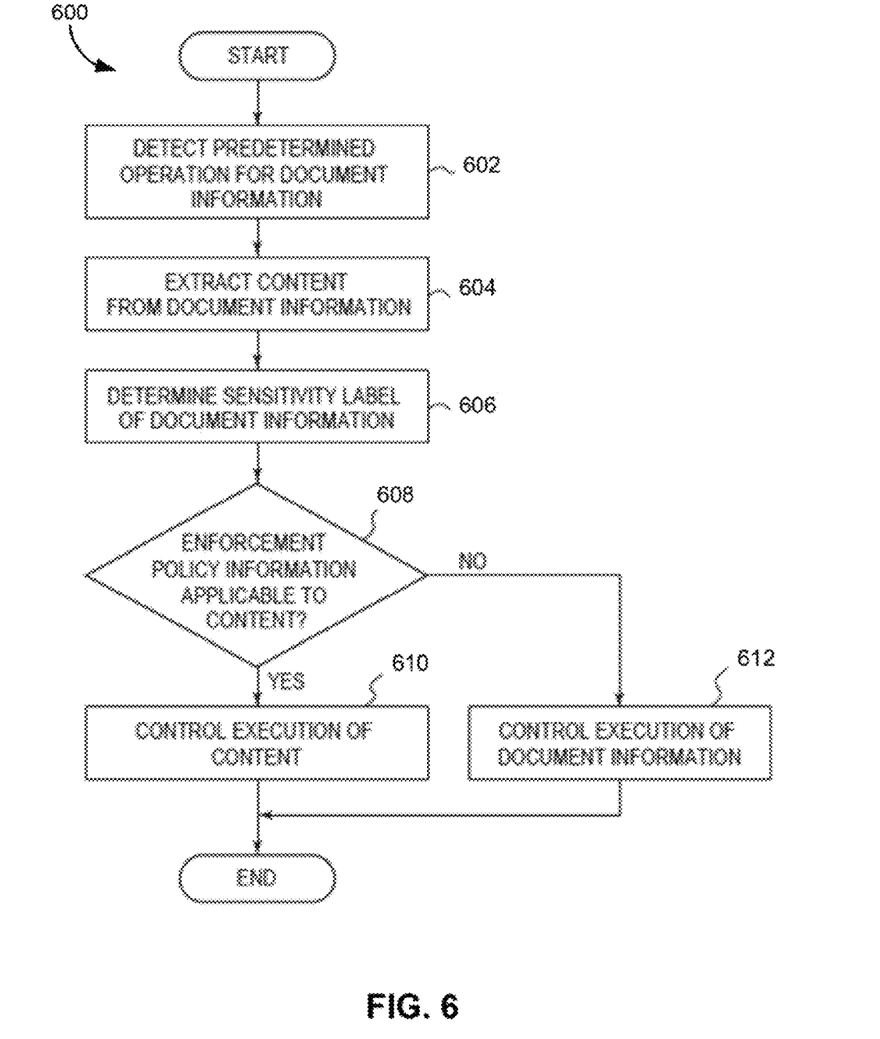
FIG. 6 is a flowchart showing a processing flow of a method, according to one embodiment.

Referring now to FIG. 6, a flowchart of a processing flow of a method 600 is shown, according to one embodiment. The method 600 may be carried out in any desired environment, including those shown and described in FIGS. 1-5, among others. Of course, more or less operations than those described and shown in FIG. 6 may be included in method 600, according to various embodiments. Referring to FIGS. 3 and 6, in one approach, the control unit 334 in the label determination device 303 may detect the predetermined operation for the document information, determine the sensitivity label, and perform the execution control for the document information. In the following description of method 600, it is assumed that the policy information is already acquired by the policy information acquisition unit 343.

In operation 602, a predetermined operation for the document information is detected. In one example, the control unit 334 (the operation detection unit 341) may detect the predetermined operation for the document information, which is received by the operation unit 331. Of course, any other method, system, and/or device may used to perform any of the operations described herein, according to various embodiments, as would be understood by one of skill in the art upon reading the present descriptions.

In operation 604, content included in the document information for which the predetermined operation is performed is extracted in response to the detection of the predetermined operation. For example, the control unit 334 (the content extraction unit 342) may extract content included in the document information for which the predetermined operation is performed, in response to the detection of the predetermined operation in operation 602.

In operation 606, the sensitivity label of the document information is determined, such as by determining the sensitivity label corresponding to the content based on the labeling policy information. For example, the control unit 334 (the determination unit 344) may determine the sensitivity label of the document information by determining the sensitivity label corresponding to the content based on the labeling policy information acquired from the policy server 301, in response to the extraction of the content in operation 604.

In operation 608, it is determined whether or not the enforcement policy information corresponding to the predetermined operation is applicable to the content. For example, the control unit 334 (the execution control unit 345) may determine whether or not the enforcement policy information corresponding to the predetermined operation detected in operation 602 is applicable to the content. The control unit 334 (the execution control unit 345) goes to operation 610 when the determination results in "YES," and goes to operation 612 when the determination results in "NO."

In operation 610, execution of the content is controlled, such as by the control unit 334 (the execution control unit 345), based on the enforcement policy information. After completion of operation 610, processing ends, such as by command of the control unit 334.

In operation 612, execution of the document information is controlled, such as by the control unit 334 (the execution control unit 345), based on the enforcement policy information. After completion of operation 612, processing ends, such as by command of the control unit 334.

As described herein, according to various embodiments, the label determination device 303 may extract content of the document information by the content extraction unit 342, in response to the detection of the predetermined operation by the operation detection unit 341. The label determination device 303 then determines the sensitivity label of the document information by determining the sensitivity label corresponding to the content based on the policy information acquired from the policy server 301, in response to the extraction of the content, according to one embodiment.

Hence, the label determination device 303 may determine the sensitivity label of the document information in real time. In addition, the label determination device 303 may flexibly determine the sensitivity label based on the content included in the document information.

Moreover, the label determination device 303 may acquire the policy information from the policy server 301 by the policy information acquisition unit 343, in response to the extraction of the content by the content extraction unit 342, in another embodiment.

Accordingly, by keeping the policy information up-to-date in the policy server 301, the label determination device 303 may determine the sensitivity label of the document information based on the up-to-date policy information acquired from the policy server 301, according to some approaches.

Moreover, the label determination device 303 may perform execution control for the document information based on the sensitivity label and the policy information by the execution control unit 345, in response to the determination of the sensitivity label by the determination unit 344, in one approach. Thus, the label determination device 303 may perform the execution control for the document information based on the up-to-date sensitivity label determined in real time. Besides, since the label determination device 303 automatically determines the sensitivity label based on the policy information acquired from the policy server 301 and performs the execution control based on the sensitivity label in some approaches, centralized management of document information sensitivity by the policy server 301 may be achieved.

Also, the label determination device 303 may perform the execution control for the document information, based on a type of the predetermined operation, the sensitivity label, and the policy information, in one approach. Hence, the label determination device 303 may flexibly perform the execution control for the document information, according to the type of the predetermined operation.

Moreover, the label determination device 303 may determine the sensitivity label for each content of the document information based on the policy information acquired from the policy server 301 by the determination unit 344, and may perform the execution control for the content of the document information based on the sensitivity label and the policy information by the execution control unit 345, in one embodiment.

Thus, the label determination device 303 may perform the execution control not on a per-document-information basis but for each content. This improves convenience, as compared with performing the execution control on a per-document-information basis. Further, the label determination device 303 may perform necessary execution control for each content, which ensures security, in one approach. That is, the label determination device 303 may achieve both convenience and security.

In addition, the label determination device 303 may be transportable by a user, and may determine the sensitivity label of the content based on positional information of the label determination device 303 and the policy information acquired from the policy server 301, in one approach. Hence, the label determination device 303 may flexibly determine the sensitivity label based on the position of the label determination device 303.

Moreover, the policy server 301 may automatically generate up-to-date policy information, upon a policy information acquisition request, in one example. This allows designation of not only a static condition corresponding to the content, but also a dynamic external factor, such as an expiration date, for the document information when, for example, document information corresponding to details of a product announcement is kept confidential until immediately before the product announcement.

In one embodiment, embodiments described herein may be implemented in a augmented reality (AR) device that employs a technique of AR. In one approach, for document information that can be viewed by the AR device, positional information of a position at which the document information or a content of the document information to be viewed is stored previously. The AR device may be provided with functionality for acquiring positional information of the AR device. This being so, control may be performed to enable the AR device to view the document information when the positional information of the AR device corresponds to the positional information stored previously.

The flowchart and block diagrams in the Figures illustrate the architecture, functionality, and operation of possible implementations of systems, methods and computer program products according to various embodiments as described in the present specification. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   a hardware processor adapted to execute logic;
   logic adapted to detect a predetermined operation input related to accessing document information;
   logic adapted to extract a content of the document information in response to detection of the predetermined operation;
   logic adapted to acquire policy information representing a relationship between the content and a sensitivity label;
   logic adapted to determine the sensitivity label of the document information by determining the sensitivity label corresponding to the content based on the policy information in response to extraction of the content;
   logic adapted to perform execution control for the document information in response to the determination of the sensitivity label, wherein the execution control for the document information is based on the sensitivity label and enforcement policy information included in the policy information, the enforcement policy information defining details of control for the document information based on the sensitivity label; and
   logic adapted to enable or disable printing for each content of the document information based on the enforcement policy information, wherein a printed matter of the document information includes at least one content of the document information minted as is and at least one content of the document information masked so that the masked content cannot be recognized.

2. The system as recited in claim 1, wherein the policy information is acquired from a policy server.

3. The system as recited in claim 2, wherein the policy information is acquired in response to extraction of the content, wherein the policy information includes enforcement policy information that defines details of control for the document information based on the sensitivity label, and wherein the sensitivity label of the document information is determined in response to the acquisition of the policy information.

4. The system as recited in claim 1, wherein the execution control is performed for the document information based on at least two of: a type of the predetermined operation, the sensitivity label, and the enforcement policy information.

5. The system as recited in claim 1, wherein the sensitivity label is determined for each content of the document information based on the enforcement policy information, and wherein the execution control for the content of the document information is based on the sensitivity label for each content and the enforcement policy information.

6. The system as recited in claim 1, further comprising:
logic adapted to acquire positional information, and wherein the sensitivity label of the content is determined based on the positional information and the policy information; and
a portable computing device comprising the logic adapted to acquire the positional information.

7. A device for determining a sensitivity label of document information, the device comprising:
a hardware processor adapted for causing the device to function according to one or more modules;
an operation detection module configured to detect a predetermined operation input related to accessing document information;
a content extraction module configured to extract a content included in the document information in response to the detection of the predetermined operation;
a policy information acquisition module configured to acquire policy information representing a relationship between the content and the sensitivity label;
a determination module configured to determine the sensitivity label of the document information by determining the sensitivity label corresponding to the content based on the policy information in response to the extraction of the content;
an execution control module configured to perform execution control for the document information in response to the determination of the sensitivity label, wherein the execution control for the document information is based on the sensitivity label and enforcement policy information included in the policy information, the enforcement policy information defining details of control for the document information based on the sensitivity label; and
a printing module configured to enable or disable printing for each content of the document information based on the enforcement policy information, wherein a printed matter of the document information includes at least one content of the document information printed as is and at least one content of the document information masked so that the masked content cannot be recognized;
a position module configured to acquire positional information; and
a communication module configured to communicate with a policy server,
wherein the sensitivity label of the content is determined based on the positional information and the policy information.

8. The device as recited in claim 7, wherein the device is a portable computing device.

9. A system, comprising:
a hardware policy server, comprising:
a policy information storage unit configured for storing labeling policy information and enforcement policy information;
a policy information management module configured to:
generate labeling policy information and enforcement policy information for transmission to a device in response to reception of a request to acquire policy information from the device; and
transmit the labeling policy information and the enforcement policy information to the device,
wherein the labeling policy information represents a relationship between a content of the document information and a sensitivity label, and
wherein the enforcement policy information defines details of control for the document information based on the sensitivity label; and a device for determining the sensitivity label of document information, the device comprising:
a hardware processor adapted to cause the device to function according to one or more modules;
an operation detection module configured to detect a predetermined operation input related to accessing the document information, wherein the predetermined operation is a print operation, wherein the operation detection module is configured to enable or disable printing for each content of the document information based on the enforcement policy information, wherein a printed matter of the document information includes at least one content of the document information printed as is and at least one content of the document information masked so that the masked content cannot be recognized;
a content extraction module configured to extract the content of the document information in response to the detection of the predetermined operation;
a policy information acquisition module configured to:
request the policy server to acquire the labeling policy information and the enforcement policy information; and
acquire the labeling policy information and the enforcement policy information from the policy server; and
a determination module configured to:
determine the sensitivity label of the document information by determining the sensitivity label corresponding to the content based on the labeling policy information in response to extraction of the content; and
to enable or disable printing for each content of the document information based on the enforcement policy information, wherein a printed matter of the document information includes at least one content of the document information printed as is and at least one content of the document information masked so that the masked content cannot be recognized.

10. A computer program product comprising a computer readable storage medium having computer readable program code embodied therewith, the computer readable program code comprising:
computer readable program code configured to detect a predetermined operation input related to accessing document information;
computer readable program code configured to extract a content of the document information in response to detection of the predetermined operation;
computer readable program code configured. to acquire policy information representing a relationship between the content and a sensitivity label;
computer readable program code configured to determine the sensitivity label of the document information by determining the sensitivity label corresponding to the content based on the policy information in response to extraction of the content;
computer readable program code configured to perform execution control for the document information in response to the determination of the sensitivity label, wherein the execution control for the document information is based on the sensitivity label and enforcement policy information included in the policy information, the enforcement policy information defining details of control for the document information based on the sensitivity label; and computer readable program code configured to enable or disable printing for each content of the document information based on the enforcement policy information, wherein a printed matter of the document information includes at least one content of the document information printed as is and at least one content of the document information masked so that the masked content cannot be recognized.

11. The computer program product as recited in claim 10, wherein the policy information is acquired from a policy server.

12. The computer program product as recited in claim 11, wherein the policy information is acquired in response to extraction of the content, and wherein the sensitivity label of the document information is determined in response to the acquisition of the policy information.

13. The computer program product as recited in claim 10, wherein the execution control is performed for the document information based on at least two of a type of the predetermined operation, the sensitivity label, and the policy information.

14. The computer program product as recited in claim 10, wherein the sensitivity label is determined for each content of the document information based on the policy information, and wherein the execution control for the content of the document information is based on the sensitivity label for each content and the policy information.

15. The computer program product as recited in claim 10, further comprising computer readable program code configured to acquire positional information, and wherein the sensitivity label of the content is determined based on the positional information and the policy information.

16. A method, comprising:
 detecting a predetermined operation input related to accessing document information using a hardware processor of a computer system;
 extracting a content of the document information in response to detection of the predetermined operation;
 acquiring policy information comprising labeling policy information and enforcement policy information, the labeling policy information representing a relationship between the content and a sensitivity label and the enforcement policy information defining details of control for the document information based on the sensitivity label;
 determining the sensitivity label of the document information by determining the sensitivity label corresponding to the content based on the policy information in response to extraction of the content;
 performing execution control for the document information in response to the determination of the sensitivity label, wherein the execution control for the document information is based on the sensitivity label and enforcement policy information included in the policy information, the enforcement policy information defining details of control for the document information based on the sensitivity label; and
 enabling or disabling printing for each content of the document information based on the enforcement policy information, wherein a printed matter of the document information includes at least one content of the document information printed as is and at least one content of the document information masked so that the masked content cannot be recognized,
 wherein the policy information is acquired from a policy server.

17. The method as recited in claim 16, wherein the policy information is acquired in response to extraction of the content, and wherein the sensitivity label of the document information is determined in response to the acquisition of the policy information.

18. The method as recited in claim 16, wherein the execution control is performed for the document information based on at least two of: a type of the predetermined operation, the sensitivity label, and the enforcement policy information.

19. The method as recited in claim 16, wherein the sensitivity label is determined for each content of the document information based on the policy information, and wherein the execution control for the content of the document information is based on the sensitivity label for each content and the enforcement policy information.

20. The method as recited in claim 16, further comprising acquiring positional information, and wherein the sensitivity label of the content is determined based on the positional information and the policy information.

* * * * *